United States Patent
Itoh et al.

(10) Patent No.: US 8,387,080 B2
(45) Date of Patent: Feb. 26, 2013

(54) OPTICAL PICKUP APPARATUS HAVING A HEATSINK FOR DISSIPATING HEAT GENERATED BY A LASER DIODE

(75) Inventors: Hidetoshi Itoh, Gifu (JP); Hidetoshi Akimoto, Saitama (JP); Masaaki Nio, Tokyo (JP); Kenji Shimozawa, Saitama (JP)

(73) Assignees: Sanyo Electric Co., Ltd., Osaka (JP); Sanyo Optec Design Co., Ltd., Tokyo (JP)

( * ) Notice: Subject to any disclaimer, the term of this patent is extended or adjusted under 35 U.S.C. 154(b) by 938 days.

(21) Appl. No.: 12/042,234

(22) Filed: Mar. 4, 2008

(65) Prior Publication Data

US 2008/0250439 A1    Oct. 9, 2008

(30) Foreign Application Priority Data

Apr. 9, 2007   (JP) ................................. 2007-102231

(51) Int. Cl.
*G11B 33/14* (2006.01)
(52) U.S. Cl. ........................................ 720/649; 720/669
(58) Field of Classification Search .................. 720/671, 720/655, 699, 648–650, 669
See application file for complete search history.

(56) References Cited

U.S. PATENT DOCUMENTS

| | | | |
|---|---|---|---|
| 2004/0017762 A1* | 1/2004 | Sogawa et al. | 369/120 |
| 2004/0117810 A1* | 6/2004 | Murata et al. | 720/649 |
| 2005/0005282 A1* | 1/2005 | Chen | 720/672 |
| 2005/0132393 A1* | 6/2005 | Omori et al. | 720/669 |
| 2005/0259702 A1* | 11/2005 | Kubota et al. | 372/34 |
| 2007/0082419 A1* | 4/2007 | Nabe et al. | 438/22 |
| 2007/0223545 A1* | 9/2007 | Saito et al. | 372/36 |
| 2008/0074962 A1* | 3/2008 | Toyoda et al. | 369/44.11 |

FOREIGN PATENT DOCUMENTS

| | | |
|---|---|---|
| CN | 1697047 | 11/2005 |
| JP | 2005-332465 | 12/2005 |

OTHER PUBLICATIONS

Chinese Office Action for Application No. 200810082269.3, mailed Jan. 12, 2011, 8 pages.

* cited by examiner

*Primary Examiner* — Craig A. Renner
*Assistant Examiner* — Adam B Dravininkas
(74) *Attorney, Agent, or Firm* — Fish & Richardson P.C.

(57) ABSTRACT

An optical pickup apparatus comprising: a housing configured to include an optical component including a laser diode emitting a laser beam, the housing being made of metal; and a heatsink configured to dissipate heat generated from the laser diode, the heatsink being made of metal different from the metal of the housing; the heatsink being fixed to the housing with one screw and adhesive.

5 Claims, 4 Drawing Sheets

OPTICAL PICKUP APPARATUS HAVING A HEATSINK FOR DISSIPATING HEAT GENERATED BY A LASER DIODE

CROSS-REFERENCE TO RELATED APPLICATION

This application claims the benefit of priority to Japanese Patent Application No. 2007-102231, filed Apr. 9, 2007, of which full contents are incorporated herein by reference.

BACKGROUND OF THE INVENTION

1. Field of the Invention

The present invention relates to an optical pickup apparatus configured to read out a signal recorded in an optical disc with a laser beam.

2. Description of the Related Art

There are widely used optical disc devices capable of reading out or recording a signal by applying a laser beam emitted from an optical pickup apparatus onto a signal recording layer provided in an optical disc.

While there is commonly used an optical disc device in which an optical disc called CD or DVD is used, there has recently been commercialized an optical disc device in which an optical disc with improved recording density, i.e. Blu-ray disc or HD DVD (High Density Digital Versatile Disc), is used. In order to improve the density of a signal recorded in an optical disc, the spot diameter of a laser beam applied to a signal surface of the optical disc should be decreased, and to that end, the wavelength of the laser beam should be decreased. An optical pickup apparatus used in the optical disc device includes a laser diode generating a laser beam.

An infrared laser beam is used for reproducing a signal recorded in a CD standard disc described above; a red laser beam is used for reproducing a signal recorded in a DVD standard disc; and a blue-purple laser beam is used for reproducing a signal recorded in a Blu-ray standard disc or an HD DVD standard disc (next generation DVD).

There is provided an idea of commercialization of an optical disc device in which optical discs of all the above standards can be used, which necessitates an optical pickup apparatus enabling a signal recording and reproducing operation for all the above optical discs. Such an optical pickup apparatus requires the individual laser beams corresponding to the optical disc standards, which results in the incorporation in one housing of, for example, three laser diodes that are: a laser diode emitting the laser beam for CD; a laser diode emitting the laser beam for DVD; and a laser diode emitting the laser beam for next-generation DVD. When supplied with a drive signal, the laser diode in an optical pickup apparatus performs the operation of generating and emitting a laser beam, which is accompanied by the heat generation. In an optical pickup apparatus including a number of laser diodes, not only the layout of optical system components becomes complicated but also the optical pickup apparatus itself is miniaturized, and for this reason, it is required to dissipate heat given off from a laser diode with efficiency.

There is commonly adopted a technique for such a heat dissipating operation utilizing a thin cover made of metals such as stainless or copper, which is provided for protecting the optical system components (See Japanese Patent Laid-Open No. 2005-332465).

The cover described in the Japanese Patent Laid-Open No. 2005-332465 is fixed to a frame with one screw by screwing and with fixing portion. The above fixing portion constituted by a bent strip which serves for positioning, and the cover is fixed to the frame only with a screw.

In such a structure, there is a problem that when an impact is given to the optical pickup apparatus, the cover thereof slips out of place due to an insufficient force for fixing the cover so that the optical characteristics of the optical pickup apparatus are badly affected. As a method for solving such a problem, a method to fix the cover to the frame by using more than two screws is practiced.

A frame or a cover is typically made of metal, however, the frame and the cover are different in metal material such as: aluminum, zinc, and magnesium for the frame; and copper and stainless for the cover. Therefore, when the optical pickup apparatus rises in temperature due to the heat given off from the laser diode, a bias force acts between the frame and the cover due to the difference in expansion or shrinkage rate between metals. Therefore, in the optical pickup apparatus with the cover thereof fixed to the frame with more than two screws, a phenomenon such as twist occurs in the frame or the cover, so that the optical system constituting the optical pickup apparatus is badly affected, which is a problem.

SUMMARY OF THE INVENTION

An optical pickup apparatus according to an aspect of the present invention, comprises: a housing configured to include an optical component including a laser diode emitting a laser beam, the housing being made of metal; and a heatsink configured to dissipate heat generated from the laser diode, the heatsink being made of metal different from the metal of the housing; the heatsink being fixed to the housing with one screw and adhesive.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

Figure 1:
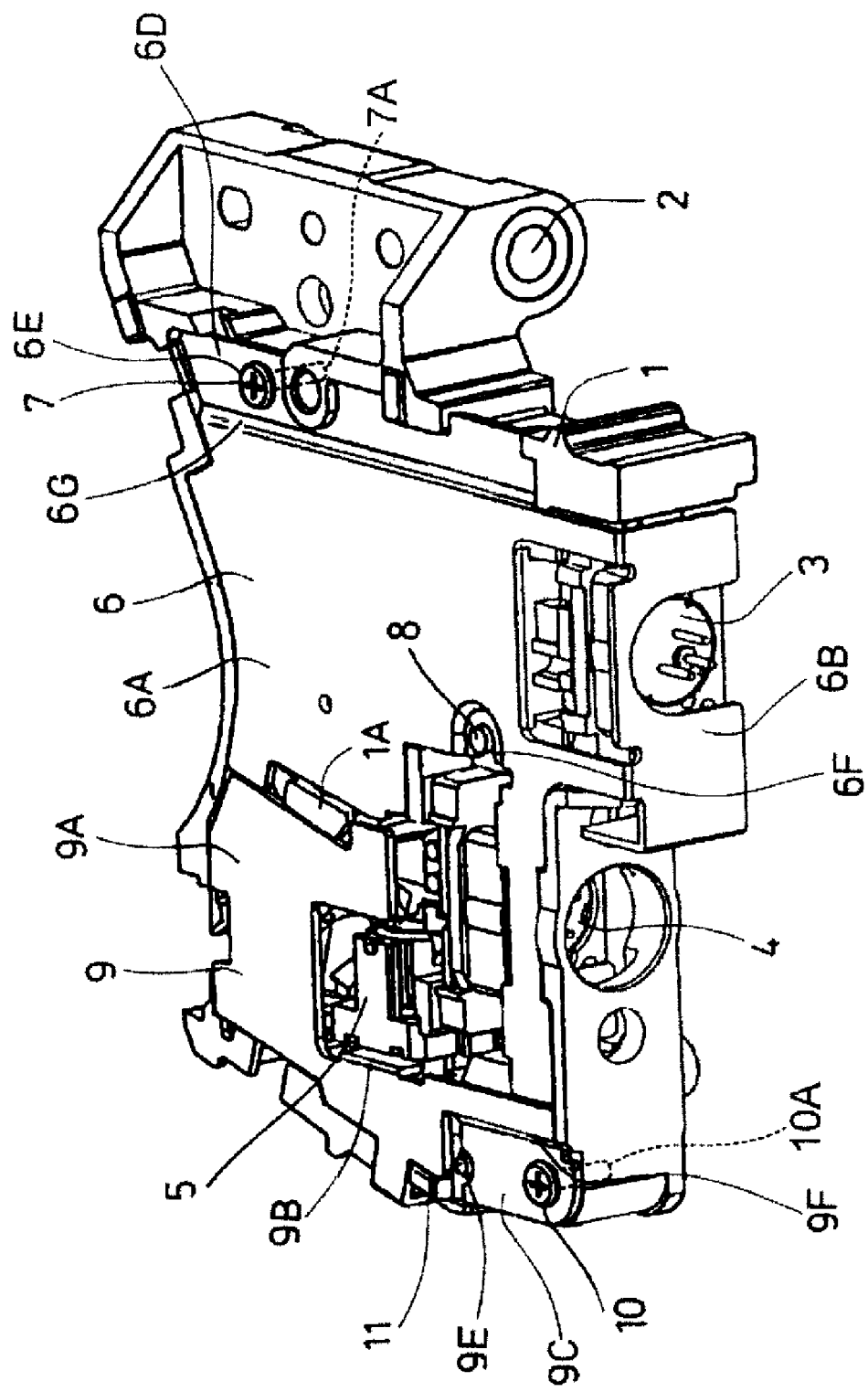
FIG. 1 is a perspective view of an optical pickup apparatus according to an embodiment of the present invention.

At least the following details will become apparent from descriptions of this specification and of the accompanying drawings.

An optical pickup apparatus according to an embodiment of the present invention comprises: a housing, which is made of metal, configured to include an optical component and a laser diode emitting a laser beam; and a heatsink, which is made of metal different from material of the housing, configured to dissipate heat generated from the laser diode, and the optical pickup apparatus is configured such that a fixing operation of the heatsink to the housing is performed by a screwing operation with a single screw and a bonding operation with adhesive.

An optical pickup apparatus according to an embodiment of the present invention comprises: a housing, which is made of metal, configured to include a first and a second laser diodes emitting laser beams with wavelengths thereof different from each other and optical components guiding laser beam emitted from each of the laser diodes to an objective lens; and a first and a second heatsinks, which are made of metal different from material of the housing, configured to dissipate heat generated from the first and the second laser diodes individually, and the optical pickup apparatus is configured such that each of fixing operations of the first and the second heatsinks to the housing is performed by a screwing operation with a single screw and a bonding operation with adhesive.

The optical pickup apparatus according to an embodiment of the present invention is configured such that the bonding operation of the heatsink to the housing is performed at two different places.

The optical pickup apparatus according to an embodiment of the present invention is configured such that each of the bonding operations of the first and the second heatsinks to the housing is performed: at one place different in position between the first and the second heatsinks; and at one place common to the first and the second heatsinks.

In the optical pickup apparatus according to an embodiment of the present invention, a step for reinforcement is provided in the first and the second heatsinks.

In the optical pickup apparatus according to an embodiment of the present invention, the direction of the step is the same as the traveling direction of the optical pickup apparatus.

In the optical pickup apparatus according to an embodiment of the present invention, the fixing operation of the heatsink configured to dissipate heat generated from the laser diode, to the housing is performed by the screwing operation with a single screw and the bonding operation with adhesive. Accordingly, not only the fixing operation can be securely performed, but also a bias force caused by the difference in expansion or shrinkage rate between metals can be absorbed by the adhesive expansion and contraction due to the adhesive strength change depending on the change in temperature. Consequently, the optical characteristics of the optical pickup apparatus are not badly affected.

In the optical pickup apparatus according to an embodiment of the present invention, the bonding operation of the heatsink to the housing is performed at two different places, that is, the fixing operation including the bonding operation together with the screwing operation with the screw is performed at three places. Therefore, the fixing operation can be performed in a well-balanced manner.

In the optical pickup apparatus according to an embodiment of the present invention, each of the bonding operations of the first and the second heatsinks to the housing is performed: at one place different in position between the first and the second heatsinks; and at one place common to the first and the second heatsinks. Therefore, there can be reduced the number of the places at which the bonding work is conducted, so that there can be improved workability of the assembly of the optical pickup apparatus.

In the optical pickup apparatus according to an embodiment of the present invention, a step for reinforcement is provided in the first and the second heatsinks. Therefore, the slimming down of the heatsinks does not cause the decrease in strength thereof.

In the optical pickup apparatus according to an embodiment of the present invention, the direction of the step is the same as the traveling direction of the optical pickup apparatus. Therefore, the heatsink can be increased in strength for a traveling operation.

Embodiment

In FIGS. 1 to 4, the reference numeral 1 indicates a housing molded of metal materials such as aluminum, zinc, and magnesium, and includes optical components such as a collimator lens, a polarizing beamsplitter, a quarter-wave plate, a reflecting mirror, and an objective lens. The housing 1 is formed with a guide hole 2 in which a guide member for guiding an optical pickup apparatus in traveling operation in the radial direction of an optical disc is to be inserted.

The reference numeral 3 indicates a first laser diode generating and emitting a laser beam for next-generation DVD, for example, and fixed in a predetermined place provided in the housing 1. The reference numeral 4 indicates a second laser diode generating and emitting a laser beam for DVD, for example, and fixed in a predetermined place provided in the housing 1. The reference numeral 5 indicates a third laser diode generating and emitting a laser beam for CD, for example, and fixed in a predetermined place provided in the housing 1.

The reference numeral 6 indicates a first heatsink: provided as a cover for covering optical components related to a laser beam emitted from the first laser diode 3; provided to dissipate heat generated from the first laser diode 3 and the second laser diode 4, etc; and made of metals such as stainless and copper.

Figure 2:
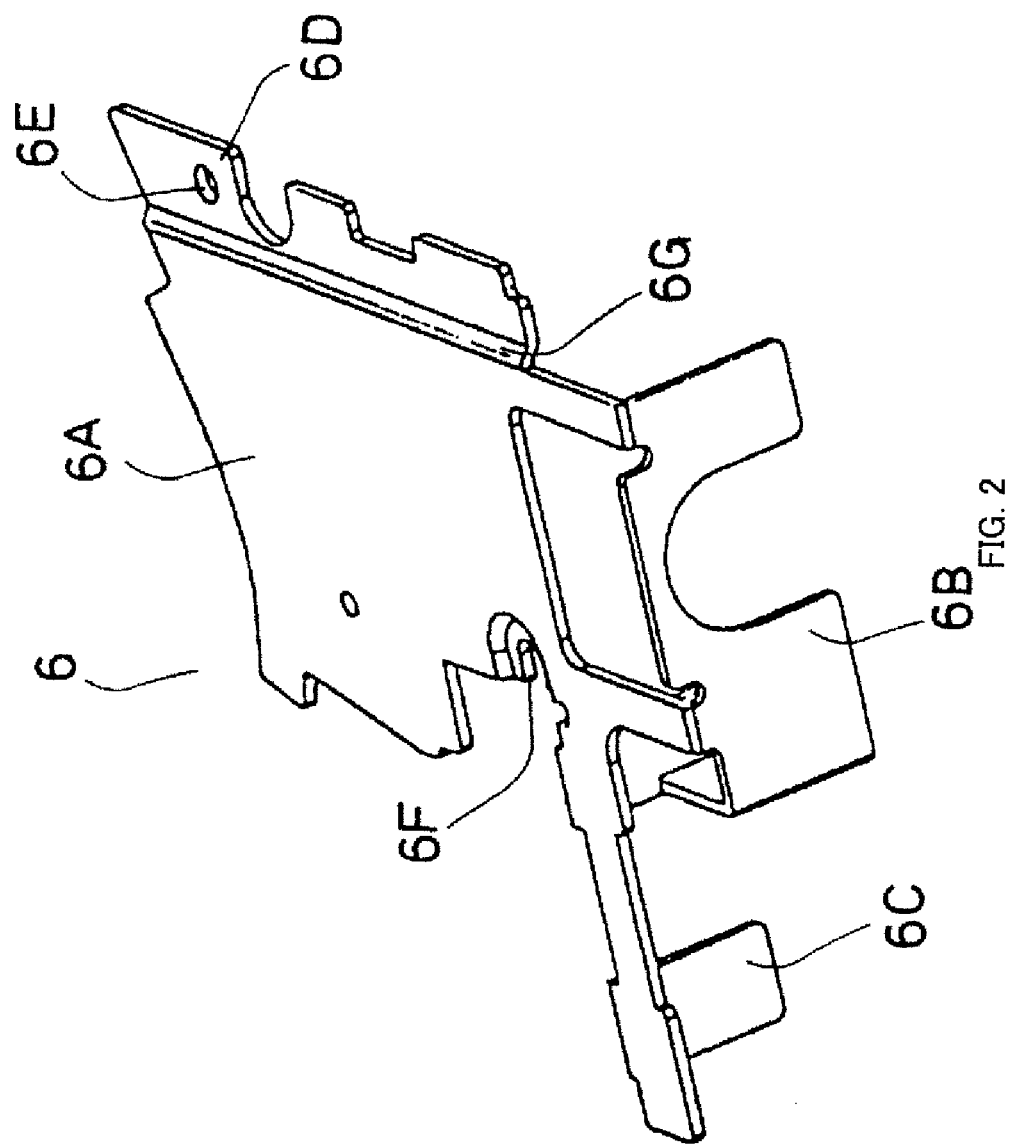
FIG. 2 is a perspective view of a first heatsink according to an embodiment of the present invention.

The first heatsink 6 is in a shape shown in FIG. 2, and is formed with: a flat plate portion 6A serving as a cover portion; a bent portion 6B formed with a through beam portion for the first laser diode 3; a bent portion 6C formed with a through beam portion for the second laser diode 4; and a fixing portion 6D with which a fixing operation to the housing 1 is performed. The fixing portion 6D is provided with a first pilot hole 6E to admit a first screw 7 to be screwed to the housing 1. The first heatsink 6 is formed with a positioning hole 6F as a first insertion hole to engage a first positioning pin 8 provided in the housing 1.

The fixing portion 6D formed in the first heatsink 6 is provided with a step portion 6G for forming a step with respect to the flat plate portion 6A so as to increase the strength as a cover. The direction of such a step is the same as the direction of the guide hole 2, that is, the traveling direction of the optical pickup apparatus.

The reference numeral 9 indicates a second heatsink: provided as a cover for covering optical components related to a laser beam emitted from the third laser diode 5; provided to dissipate heat generated from the third laser diode 5 etc; and made of metals such as stainless and copper.

Figure 3:
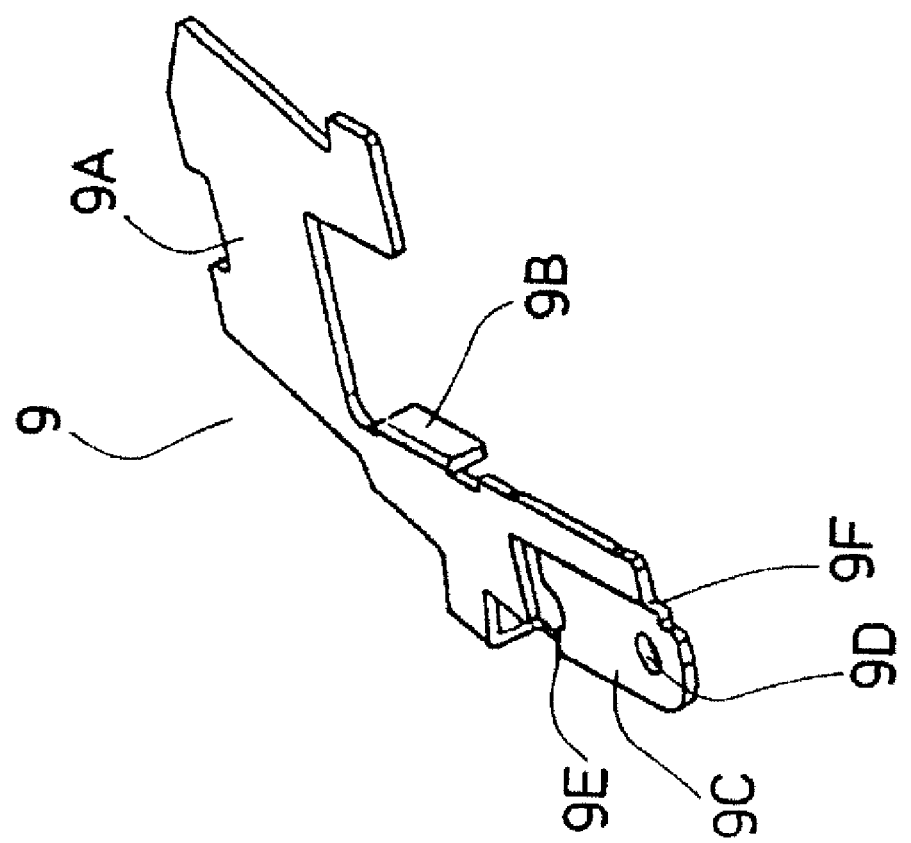
FIG. 3 is a perspective view of a second heatsink according to an embodiment of the present invention.

The second heatsink 9 is in a shape shown in FIG. 3, and is formed with: a flat plate portion 9A serving as a cover portion; a bent portion 9B provided to abut the third laser diode 5; and a fixing portion 9C with which a fixing operation to the housing 1 is performed. The fixing portion 9C is provided with a second pilot hole 9D to admit a second screw 10 to be screwed to the housing 1. The second heatsink 9 is formed with a positioning hole 9E as a second insertion hole to engage a second positioning pin 11 provided in the housing 1.

The fixing portion 9C formed in the second heatsink 9 is provided with a step portion 9F for forming a step with respect to the flat plate portion 9A so as to increase the strength as a cover. The direction of such a step is the same as the direction of the guide hole 2, that is, the traveling direction of the optical pickup apparatus.

In such a structure, there are performed: a fixing operation of the first laser diode 3, the second laser diode 4, and the third laser diode 5, to the predetermined places formed in the housing 1; and also an operation of fixing to the housing 1 the optical components making up an optical system guiding a laser beam emitted from each of the laser diodes to the objective lens provided so as to condense the laser beam to a signal recording layer provided in an optical disc of each standard.

The fixing operation of the optical components to the housing 1 is followed by a fixing operation of the first heatsink 6 and the second heatsink 9 to the housing 1. A fixing work of the first heatsink 6 is started with disposing so as to: align a first screw hole 7A formed in the housing 1 with the first pilot hole 6E formed in the fixing portion 6D; and engage the first positioning pin 8 provided in the housing 1 in the positioning hole 6F.

By screwing the first screw 7 through the first pilot hole 6E while disposing the first heatsink 6 in the predetermined position in the housing 1, the fixing portion 6D can be threadedly fixed to the housing 1. A state shown in FIG. 1 is a state in which the first heatsink 6 is threadedly fixed to the housing 1 with the first screw 7. The present embodiment is characterized by that the first heatsink 6 is adhesively fixed to the housing 1 with adhesive on top of the above state.

Figure 4:
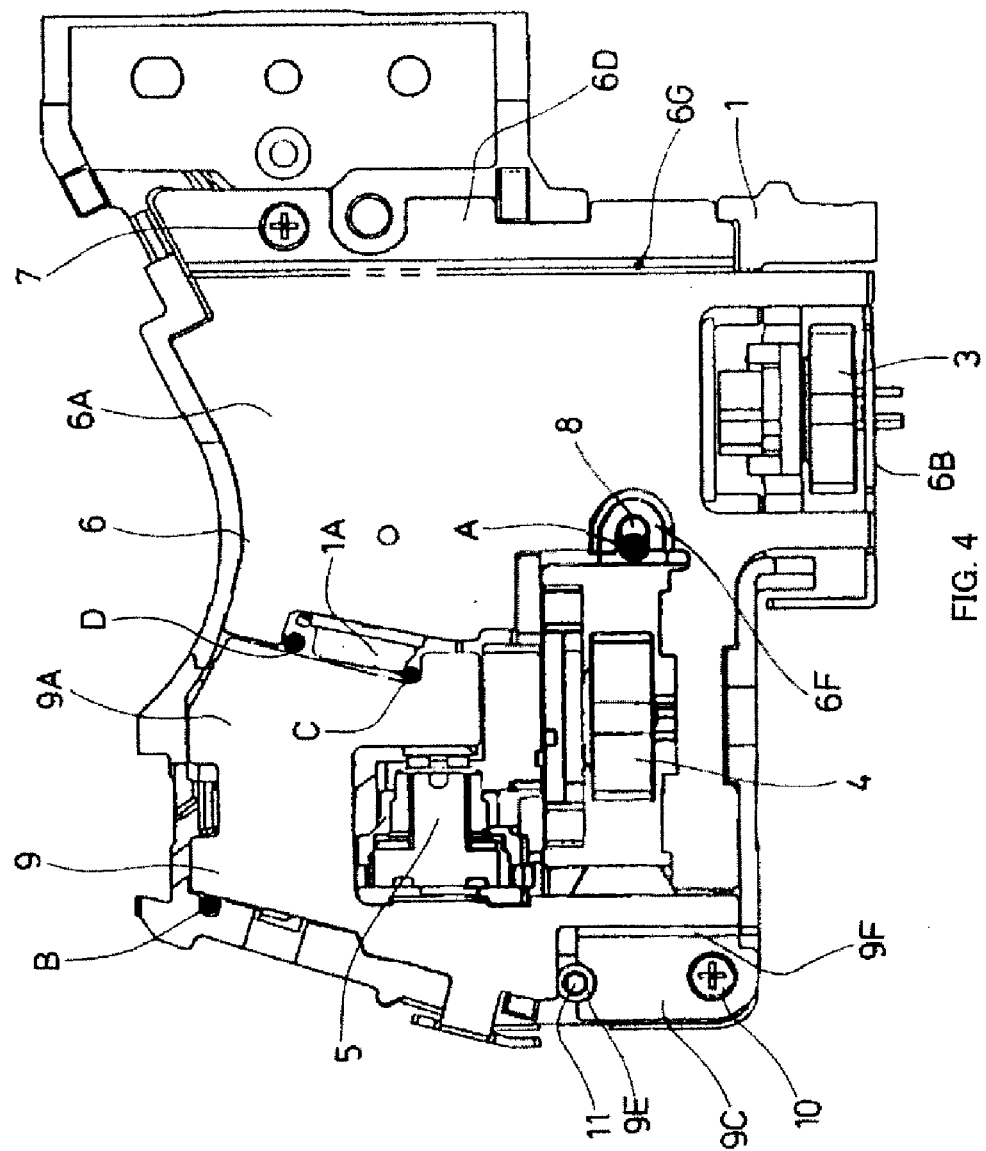
FIG. 4 is a plan view of an optical pickup apparatus according an embodiment of the present invention.

That is, in FIG. 4, a black circle A indicates a place at which the first heatsink 6 is bonded to the housing 1, and in the present embodiment, bonding is performed at an engagement portion of the first positioning pin 8 and the positioning hole 6F formed in the first heatsink. The engagement portion to be bonded on the housing side is referred to as a first housing bonding portion, and the engagement portion to be bonded on the heatsink side is referred to as a first heatsink bonding portion. In the present embodiment, the adhesive fixing operation of the first heatsink 6 to the housing 1 is performed at one place, however, one more place may be added. That is, the fixing operation of the first heatsink 6 to the housing 1 is performed at three places in total that are one fixing place with the first screw and two adhesive fixing places including the black circle A, for example, and thereby the fixing operation can be performed in a well-balanced manner.

For the first heatsink 6, the fixing operation thereof to the housing 1 is performed as described above, and next, a fixing operation of the second heatsink 9 will hereinafter be described. A fixing work of the second heatsink 9 is started with disposing so as to: align a second screw hole 10A formed in the housing 1 with the second pilot hole 9D formed in the fixing portion 9C; and engage the second positioning pin 11 provided in the housing 1 in the positioning hole 9E.

By screwing the second screw 10 through the second pilot hole 9D while disposing the second heatsink 9 in the predetermined position in the housing 1, the fixing portion 9C can be threadedly fixed to the housing 1. A state shown in FIG. 1 is a state in which the second heatsink 9 is threadedly fixed to the housing 1 with the second screw 10. The present embodiment is characterized by that the second heatsink 9 is adhesively fixed to the housing 1 with adhesive on top of the above state.

That is, in FIG. 4, black circles B and C indicate places at which the second heatsink 9 is bonded to the housing 1, and in the present embodiment, bonding is performed at two places that are an edge portion of the housing 1 and an adhesive fixing portion 1A. The portion to be bonded on the housing side is referred to as a second housing bonding portion, and the portion to be bonded on the heatsink side is referred to as a second heatsink bonding portion. In the present embodiment, since the adhesive fixing operation of the second heatsink 9 to the housing 1 is performed at two places, the fixing operation can be performed in a well-balanced manner. However, if the firm fixing operation is unnecessary, bonding may be performed at one place.

In the case that the first heatsink 6 and the second heatsink 9 are disposed in an adjacent manner as in the present embodiment, the number of bonding works can be reduced by performing the adhesive fixing operation to the housing 1 at a black circle D in the FIG. 4, that is, a common bonding place for fixing the first heatsink 6 and the second heatsink 9 to the housing 1. Therefore, the efficiency of assembly work of the optical pickup apparatus can be improved.

As described above, since the fixing operation of the first heatsink 6 and the second heatsink 9 to the housing 1 is performed by one screw and the adhesive fixing operation with adhesive, not only sufficient strength can be obtained, but also a bias force caused by the difference in expansion or shrinkage characteristics between metals can be absorbed in the bonding portion by the adhesive expansion and contraction due to the adhesive strength change depending on the change in temperature.

The structure is such that heat generated from the first laser diode 3, the second laser diode 4, and the third laser diode 5 is transferred to the first heatsink 6 and the second heatsink 9 with efficiency. For structures of heat transfer as described above, each heatsink may abut the laser diodes directly, or a member for transferring heat may be provided to transfer heat to each heatsink.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:
1. An optical pickup apparatus comprising:
a housing configured to include optical components including a first laser diode and a second laser diode emitting respectively laser beams with wavelengths that are different from each other;
a first heatsink made of metal and configured to dissipate heat generated from the first laser diode, the first heatsink comprising:
a first fixing portion located on a far edge of the first heatsink;
a first pilot hole located in the first fixing portion, the first pilot hole guiding a single first screw into a first screw hole located in the housing, the first heatsink being fixed to the housing with the single first screw;
a second heatsink made of metal, configured to dissipate heat generated from the second laser diode, and disposed in a manner adjacent to the first heatsink, the second heatsink comprising:
a second fixing portion located on a far edge of the second heatsink;
a second pilot hole located in the second fixing portion, the second pilot hole guiding a single second screw into a second screw hole located in the housing, the second heatsink being fixed to the housing with the single second screw; and
an adhesive fixing portion providing a common bonding portion for the housing, the first heatsink, and the second heatsink to be bonded in common with an adhesive, the adhesive fixing portion being adjacent to a near edge of the first heatsink and a near edge of the second heatsink;
wherein:

the near edge of the first heatsink and the near edge of the second heatsink are adjacent to one another and located substantially in the center of the housing, the first heatsink, and the second heatsink are bonded to the housing with the adhesive placed at a single position on the adhesive fixing portion, the single position located at the near edge of the first heatsink that is adjacent to the near edge of the second heatsink such that the adhesive fixes the first heatsink to the second heatsink and to the housing at the single position, the first heatsink is fixed to the housing with the single first screw and the adhesive, and the second heatsink is fixed to the housing with the single second screw and the adhesive.

2. The optical pickup apparatus of claim 1, wherein:

the housing includes a first housing bonding portion to be bonded, and a second housing bonding portion to be bonded;

the first heatsink includes a first heatsink bonding portion to be bonded;

the second heatsink includes a second heatsink bonding portion to be bonded;

the first heatsink is further fixed to the housing by bonding the first heatsink bonding portion to the first housing bonding portion with the adhesive; and the second heatsink is further fixed to the housing by bonding the second heatsink bonding portion to the second housing bonding portion with the adhesive.

3. The optical pickup apparatus of claim 2, wherein:

the housing further includes a first pin for positioning the first heatsink to be fixed in the housing, and a second pin for positioning the second heatsink to be fixed in the housing;

the first heatsink further includes a first insertion hole that the first pin is to be inserted into; and the second heatsink further includes a second insertion hole that the second pin is to be inserted into.

4. The optical pickup apparatus of claim 1, wherein at least one of the first heatsink and the second heatsink includes a step portion for increasing strength.

5. The optical pickup apparatus of claim 1, wherein each of the first heatsink and the second heatsink provide a cover for covering the optical components included in the housing.

* * * * *